United States Patent [19]

Kishi

[11] 4,327,418

[45] Apr. 27, 1982

[54] HIGH SPEED INFORMATION SELECTION AND TRANSFER SYSTEM

[75] Inventor: Norimasa Kishi, Yokosuka, Japan

[73] Assignee: Nissan Motor Co., Ltd., Yokohama, Japan

[21] Appl. No.: 103,480

[22] Filed: Dec. 14, 1979

[30] Foreign Application Priority Data

Jan. 5, 1979 [JP] Japan .................................. 54-50

[51] Int. Cl.³ ............................................. H04Q 3/00
[52] U.S. Cl. ................................. 364/715; 340/825.89
[58] Field of Search ...................... 364/715; 340/166 R

[56] References Cited

U.S. PATENT DOCUMENTS

| | | | |
|---|---|---|---|
| 3,317,897 | 5/1967 | Ceonzo et al. | 340/166 R |
| 3,395,251 | 7/1968 | Taylor | 340/166 R X |
| 3,593,295 | 7/1971 | Joel, Jr. | 340/166 R |
| 3,674,938 | 7/1972 | Jacob | 340/166 R X |
| 3,865,979 | 2/1975 | Hestad | 340/166 R X |
| 3,993,978 | 11/1976 | Hollis | 340/166 R |
| 4,038,638 | 7/1977 | Hwang | 340/166 R |
| 4,114,143 | 9/1912 | Karnaugh | 340/166 R |

Primary Examiner—David H. Malzahn
Attorney, Agent, or Firm—Lowe, King, Price & Becker

[57] ABSTRACT

A high speed information selection and transfer system is provided for transferring required information units selected from plural information stored in a memory. Information transfer includes switching over plural switching elements by referring to identifying numbers of those information unit, each of the switching elements can take either one of two states of parallel connection and crossing connection and are arranged in a matrix consisting of n columns, each of those columns containing N/2 switching elements provided for every N information units, where $n = \log_2 N$. Accordingly, plural data used for electronically controlling a motor car can be transferred rapidly under the control of a switching commander having a simple configuration.

6 Claims, 19 Drawing Figures

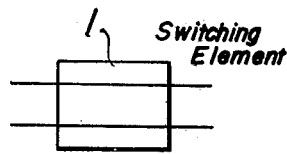
FIG.3a
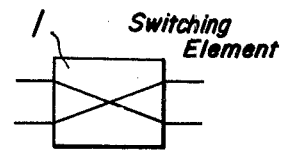
FIG.3b
FIG.4
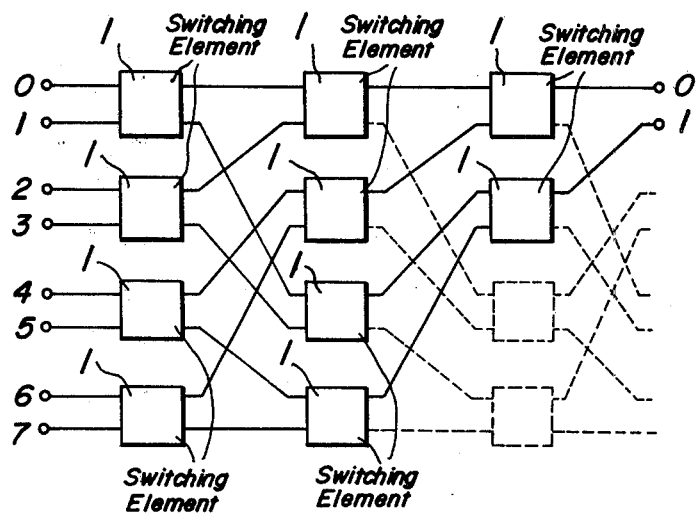
FIG.5
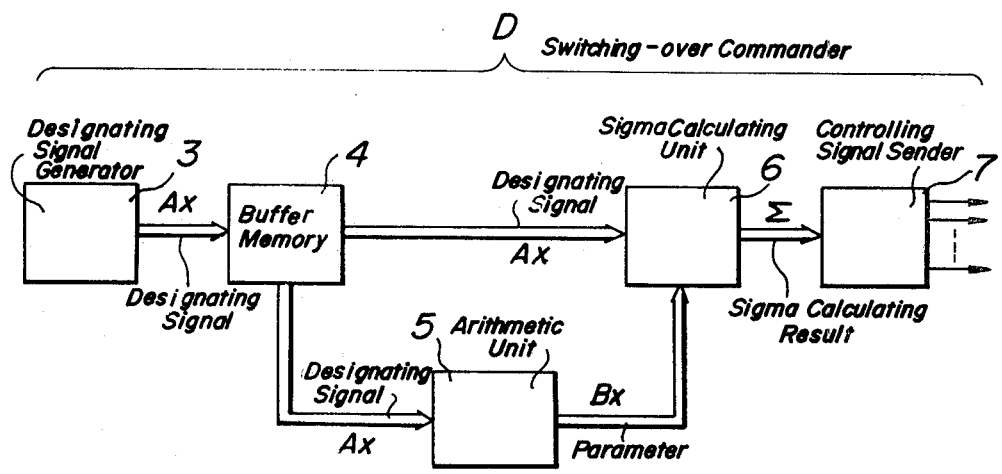

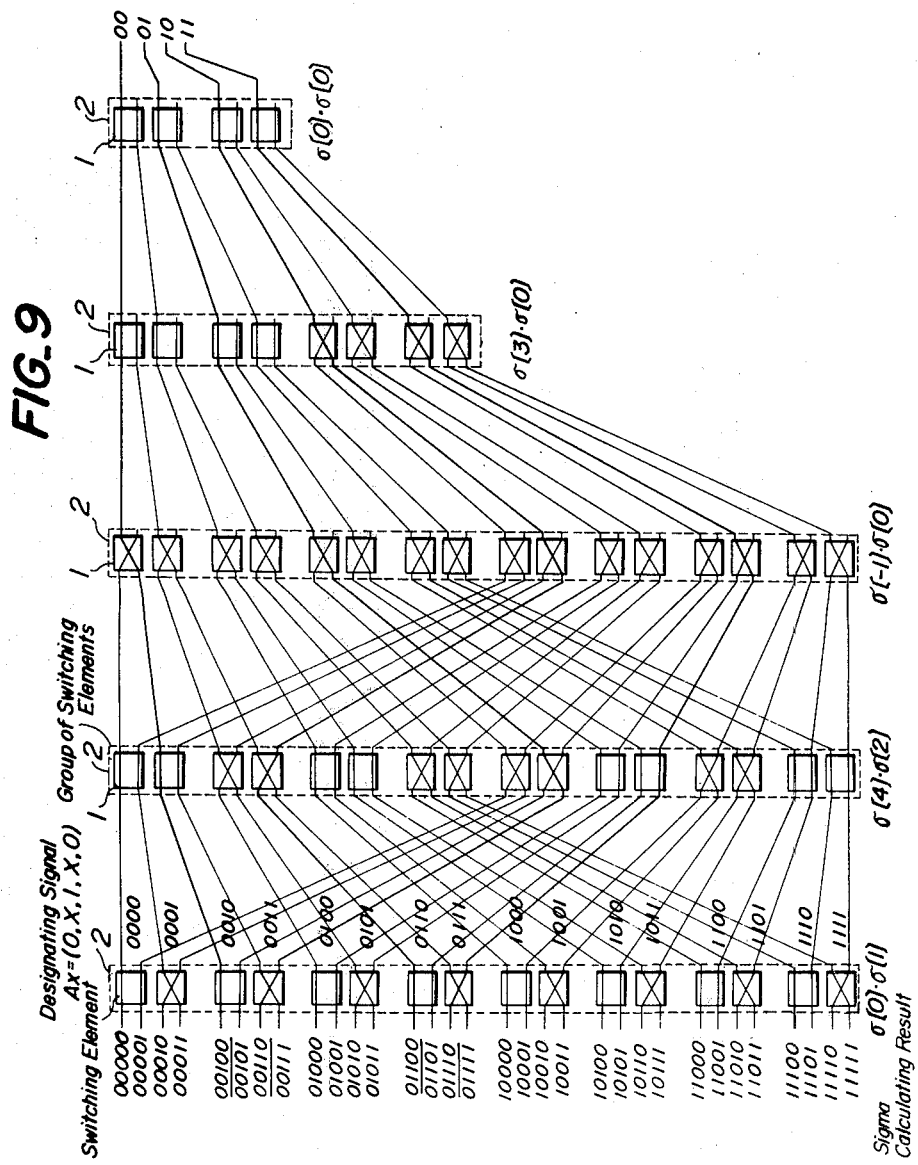

HIGH SPEED INFORMATION SELECTION AND TRANSFER SYSTEM

BACKGROUND OF THE INVENTION (1) Field of the Invention:

The present invention relates generally to an information selection and transfer system, and more particularly, to a data transfer unit arranged between a data memory and a central operation processing unit, provided for an electronic control system for controlling a vehicle such as a motor car.

(2) Description of the Prior Art:

Generally speaking, in various kinds of information selection and transfer systems, when the amount of data to be transferred is not so large, the transfer of information can be performed exactly by directly connecting to each other an information supplying unit such as a data memory and an information processing unit such as a central operation processing apparatus.

When the amount of data to be transferred is extremely large, however, it is required to control the state of transfer of information. Thus, a switching over unit consisting of plural switching elements is connected between the information supplying unit and the information processing unit, and further a switching-over commander is provided for controlling the changing-over of those switching elements, to facilitate the selection and the transfer of desired information between the information supplying unit and the information processing unit.

However, in a conventional information transfer system, in order to perform the selection and transfer of desired information, in response to the demand of the connection between the designated output terminals of the information supplying unit and the designated input terminals of the information processing unit, the combination of those terminals is stored in the switching-over commander for a time, and then the operation for setting the state of switching over of respective switching elements in the switching over unit is effected repeatedly with regard to each of the designated output terminals of the information supplying unit by referring to the above stored combination of the terminals. Accordingly, the increase of the amount of information to be transferred causes, the difficulty as the times of repetition of the above operation is increased extremely and a long time duration is required for the above control of switching over.

SUMMARY OF THE INVENTION

An object of the present invention is to remove the above conventional difficulty in information selection and transfer system.

Another object of the present invention is to effect the control of switching over of plural switching elements, for extracting desired information from plural stored information.

According to the present invention, a high speed information rapid selection and transfer system is provided wherein the operation for setting the state of switching over of respective switching elements arranged in a matrix for the exact selection of desired information is effected, by referring to identifying numbers designated to both the respective switching elements and the information and to the amount of the desired information.

The present invention will be explained in detail hereinafter by referring to the drawings.

BRIEF DESCRIPTION OF THE DRAWINGS

FIGS. 3a and 3b are block diagrams showing respectively two kinds of states of connection of a switching element provided in the above switching-over unit.

FIG. 4 is a block diagram showing another preferred embodiment of the switching-over unit provided with eight output terminals of an information supplying unit and two input terminals of an information processing unit;

FIG. 5 is a block diagram showing a preferred embodiment of a switching-over commander;

FIG. 9 is a block diagram showing a state of connection of the above switching-over unit provided with four designated output terminals selected from thirty-two output terminals of the above information supplying unit.

DESCRIPTION OF THE PREFERRED EMBODIMENTS

Figure 1:
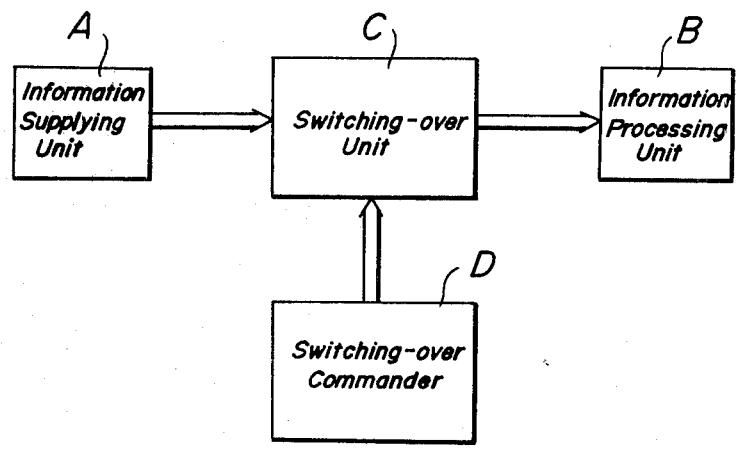
FIG. 1 is a block diagram showing a basic configuration of an information transfer system according to the present invention.

As shown in FIG. 1, an information rapid selection and transfer system according to the present invention comprises an information supplying unit A, an information processing unit B, and a switching-over unit C connected therebetween, and further a switching-over commander D which controls a state of connection of the above switching-over unit C.

The above mentioned switching-over unit C and switching-over commander D are formed respectively as follows.

Figure 2:
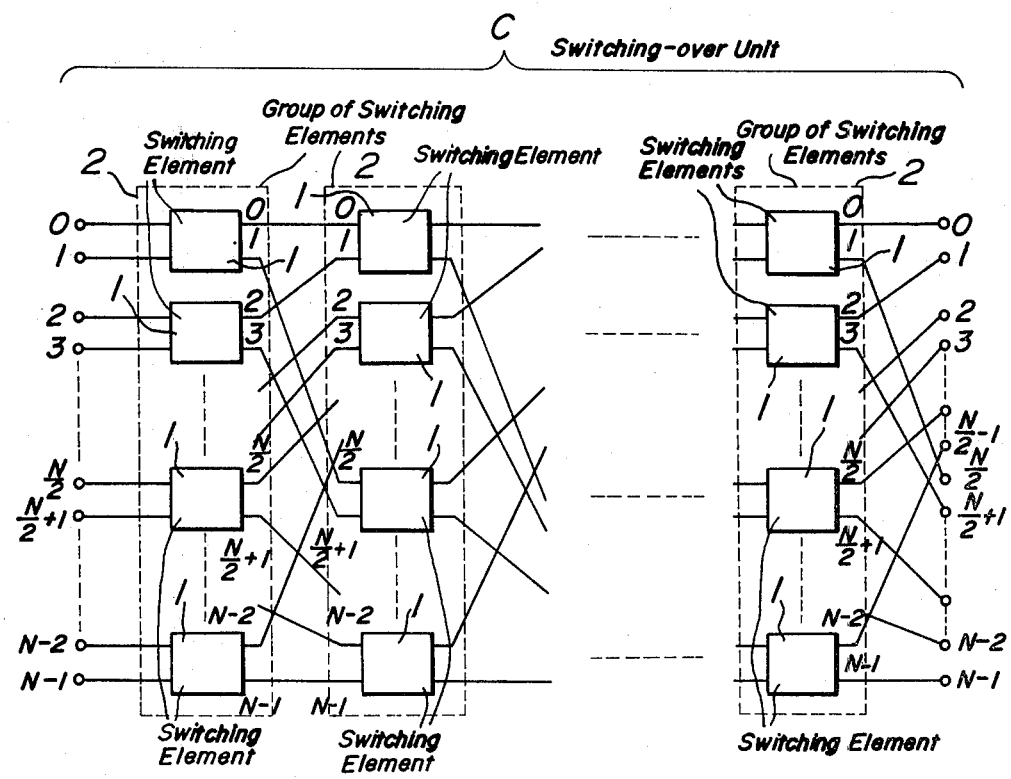
FIG. 2 is a block diagram showing a preferred embodiment of a switching-over unit in the above system.

The switching-over unit C is formed of plural switching elements 1 which are provided with two input terminals and two output terminals respectively and are arranged in a matrix, as shown in FIG. 2. Thus, when the number of output terminals of the information supplying unit A shown in FIG. 1, that is, the number of information units to be supplied therefrom, is denoted by a symbol N, the number n of columns in the matrix of the switching-over unit C, that is, the number of groups 2 of the switching elements 1 can be defined by the following equation.

$$N = 2^n, \text{ that is, } n = \log_2 N \tag{1}$$

On the other hand, the number of switching elements 1 in respective groups 2 is equal to N/2, so that the total number of switching elements 1 forming the entire switching-over unit C is equal to $N/2 \times n$.

The basic state of connection between the respective groups 2 of switching elements 1 set as follows.

As shown in FIG. 2, the input and the output terminals of respective switching elements 1 consisting in each of the groups 2 are numbered respectively in order by the numerals 0 to N−1, and the input terminals of switching elements 1 consisting in the left end group 2 shown in FIG. 2 are connected in order with the N output terminals of the information supplying unit A. Among the output terminals of those switching elements 1 in the left end group 2, the output terminals numbered by the numerals 0, 2, 4, ..., N−2 are connected in order with the input terminals numbered by the numerals 0, 1, 2, ..., N/2−1 of switching elements 1 consisting in the next group 2, whilst the output terminals numbered by the numerals 1, 3, 5, ..., N−1 are connected in order with the input terminals numbered by the numerals N/2, N/2+1, N/2+2, ..., N−1 of switching elements in the next group 2.

The input and the output terminals in n groups 2 of switching elements are connected with each other in order similarly as mentioned above, and lastly, among the output terminals of switching elements 1 in the right end group 2, the output terminals numbered by the numerals 0, 2, 4, ..., N−2 are connected in order with the input terminals numbered by the numerals 0, 1, 2, ..., N/2−1 of the information processing unit B, whilst the output terminals numbered by the numerals 1, 3, 5, ..., N−1 are connected in order with the input terminals numbered by the numerals N/2, N/2+1, N/2+2, ..., N−1 of the information processing unit B.

As is apparent from the above, the switching element 1 can take either one of two states of connection between two input terminals thereof and two output terminals thereof, that is, the leading-through state in which state the above two input and the above two output terminals are connected in parallel with each other, as shown in FIG. 3a, and the crossing state in which state those terminals are connected on the cross with each other, as shown in FIG. 3b. As a means of forming the switching element 1, for instance, using an optical coupling element, the state of coupling can be turned over between above two states under the control of an external controlling signal.

In the above-mentioned switching-over unit C, for instance, in a case wherein the information supplying unit A is formed of a memory having a large capacity and a large number N of output terminals thereof, whilst the information processing unit B is formed of another memory or a so-called CPU, that is, a control processing unit, provided with a small capacity and a small number of input terminals thereof, it is possible to simplify the configuration of the switching-over unit C by omitting some of the switching elements therein.

For example, if the number N of input terminals of the switching-over unit C is eight, that is, N=8, whilst the number of output terminals thereof is two, it is possible to omit two switching elements and the wiring connected therewith, which are shown by dotted lines in FIG. 4.

Next, the switching-over commander D comprises, as shown in FIG. 5, a designating signal generator 3 for generating a designating signal Ax such as mentioned later in response to an external demand of transfer, which is applied, for instance, by the central operation processing apparatus, a buffer memory 4 for storing the above designating signal Ax in a predetermined time duration, and an arithmetic unit 5 for effecting a calculation concerning a parameter Bx, as mentioned later, in response to the designating signal Ax derived from the buffer memory 4. Commander D further comprises a σ (sigma) calculating unit 6 which effecting the σ calculation, as mentioned later, by referring to both of the designating signal Ax and the parameter Bx, and a controlling signal sender 7 for settles the state of connection of the respective group 2 of switching elements in the switching-over unit C in response to the result Σ of the above σ calculation.

The above-mentioned designating signal Ax is a digital signal consisting of a binary code of n bits which represents the identifying number of respective one of N output terminals of the information supplying unit A, which output terminals should be connected successively with the input terminals of the information processing unit B having the identifying numbers 0, 1, 2 and so on, and which input terminals can be represented by the following equation.

$$Ax = (a_{n-1}, a_{n-2}, \ldots, a_1, a_0) \qquad (2)$$

where, $a_i \in \{0, 1, x\}$ $(i=0, 1, 2, \ldots, n-1)$ and $x=0$ or 1.

As explained is by an example, assuming the number N of output terminals of the information supplying unit A is eight, that is, N=8, the number n of the group 2 of switching elements is equal to the following in accordance with the early mentioned equation (1).

$$n = \log_2 8 = 3$$

Thus, the aforesaid designating signal Ax can be represented by a digital signal of three bits as follows.

$$Ax = (a_2, a_1, a_0)$$

In this situation where $a_0=1$, $a_1=X$ and $a_2=0$, namely $Ax=(0, x, 1)$, this expression of the designating signal Ax defines (0, 0, 1) and (0, 1, 1). These binary codes (0, 0, 1) and (0, 1, 1) are equal to the numbers 1 and 3 respectively. Consequently, the designating signal $Ax=(0, x, 1)$ designates two output terminals having the identifying numbers 1 and 3 among eight output terminals of the information supplying unit A, and further the output terminal having the number 1, which is designated by this designating signal Ax, is connected with the input terminal having the identifying number of 0 in the information processing unit B, and the output terminal having the identifying number 3, which is designated by the above designating signal Ax alao, is connected with the input terminal having the number 1 in the information processing unit B, as mentioned later.

On the other hand, the aforesaid parameter Bx is a digital signal consisting of a binary code of n bits which is defined by the following equation.

$$Bx = (b_{n-1}, B_{n-2}, \ldots, b_1, b_0) \qquad (3)$$

where, $$b_i = \begin{pmatrix} \beta_i - i & (i = 0, \ldots, |x| - 1) \\ 0 & (i = |x|, |x| + 1, \ldots, n - 1) \end{pmatrix} \qquad (4)$$

In the above equation (4), the symbol $|x|$ represents the number of the symbol X which is contained in the designating signal Ax, that is, $0 \leq |x| \leq n$, and the symbol $\beta_i$ represents the position of the symbol x in the above expression of the designating signal Ax in the situation where the position of the symbol $a_i$ in the above expression of the designating signal Ax is represented by the numeral i. Accordingly, the symbol $\beta_0$ represents the position of the symbol x of the lowest order, whilst the symbol $\beta_{|x|-1}$ represents the position of the symbol x of the highest order.

As is explained by an example, in case $Ax=(x, x, 1)$, namely, $a_0=1$, $a_1=x$ and $a_2=x$, $|x|=2$, $\beta_0=1$ and $\beta_1=2$. Thus
$b_0=\beta_0-0=1$
$b_1=\beta_1-1=1$
$b_2=0$
As a result thereof, the parameter Bx is set as follows.

$$Bx=(0, 1, 1)$$

Next, the $\sigma$ calculation is defined as follows.

In the aforesaid group 2 of switching elements, N/2 switching elements 1 are numbered in order by the numerals 0, 1, 2, ..., N/2−1, which numerals are represented by binary codes of n−1 bits respectively. For example, in case N=8 and n=3, the identifying numbers of four switching elements 1 are represented by binary codes 00, 01, 10 and 11 respectively. In this situation, an operation by which the state of connection in the switching element 1 having the identifying number represented by a binary code in which the figure of kth order from the lowest order, namely, from the right end thereof (where k=1, 2, ..., n−1) is "1", is turned over from the leading through state to the crossing state and vice versa, is represented by the symbol [k], while another operation by which the states of connection in all of the switching elements 1 belonging to one of the groups 2 are turned over is represented by the symbol $\sigma[-1]$ and further another operation by which those states of connection are not turned over at all is represented by the other symbol $\sigma[0]$.

In the $\sigma$ calculating unit 6, the operation denoted by a symbol Σ, which is represented by the following equations, is effected by referring to the designating signal Ax and the parameter Bx, which consist of the aforesaid digital signals of n bits in parallel respectively.

$$\Sigma = (\sigma_{n-1}, \sigma_{n-2}, \ldots, \sigma_1, \sigma_0) \quad (5)$$

$$\sigma_i = \begin{cases} \sigma[0] \cdot \sigma[b_i] & \text{(in case } a_i = 0) \\ \sigma[-1] \cdot \sigma[b_i] & \text{(in case } a_i = 1) \\ \sigma[n-b_j] \cdot \sigma[b_i] & \text{(in case } a_i = x) \end{cases} \quad (6)$$

where, the symbol j represents the number of the symbols x which are arranged between the term $a_0$ and the term $a_{i-1}$ in the designating signal Ax, so that, for example, in case $Ax=(0, x, x, 1, x, 0)$, j=0 corresponds to $a_1=x$, j=1 corresponds to $a_3=x$ and j=2 corresponds to $a_4=x$.

Moreover, the symbol • in the above equation (6) represents such a procedure as the operation represented by the symbol $\sigma[0]$, $\sigma[-1]$ or $\sigma[n-bj]$ is effected first, and then the operation represented by the symbol $\sigma[bi]$ is effected. Regarding the above $\sigma$ calculation, some examples thereof will be explained later in detail referring to FIGS. 7a to 7f.

From the controlling signal sender 7, the controlling signals provided for turning over the states of connection in the respective switching elements 1 belonging to each of the groups 2 in accordance with the results of operation of $\sigma_0, \sigma_1, \ldots, \sigma_{n-1}$, which results are derived from the $\sigma$ calculating unit 6, are transmitted. This controlling signal sender 7 can be arranged, for instance, in a circuit configuration such as shown in FIG. 6(a) or 6(b), in case that the number N of the output terminals of the information supplying unit A is set as $N=2^5$.

Figure 6A:
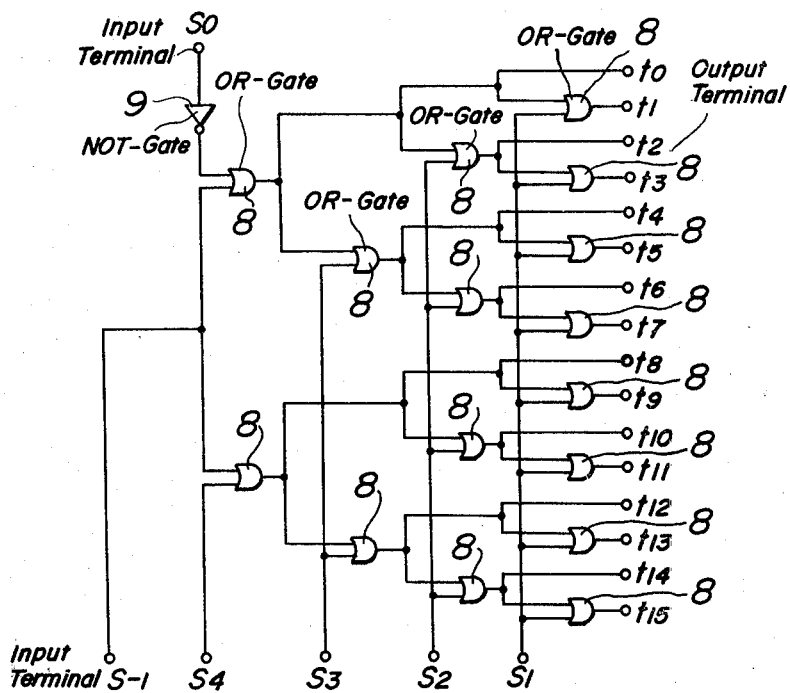
FIGS. 6a and 6b are block diagrams showing respectively two kinds of preferred embodiments of a control signal sender in the above switching-over commander.
Figure 6B:
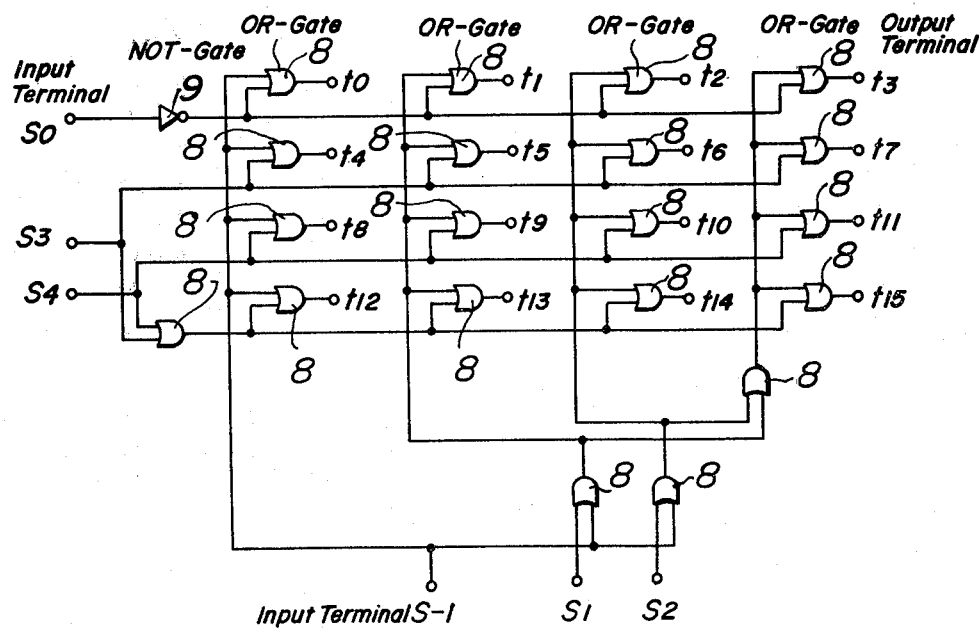

In those circuit arrangements of the sender 7, sixteen and twenty OR-gates 8 are connected with each other as shown in FIGS. 6(a) and 6(b), respectively, and a NOT-gate 9 is connected between one of those OR-gates 8 and such an input terminal $S_0$ such as mentioned later. Further six input terminals $S_{-1}$, $S_0$, $S_1$, $S_2$, $S_3$ and $S_4$ which are applied with a signal having a logic level of "1" $\sigma[0]$ respectively, when the above mentioned operations of $\sigma[-1]$, $\sigma[1]$, $\sigma[2]$, $\sigma[3]$, or $\sigma[4]$ are effected and sixteen output terminals from which the controlling signals are transmitted respectively to sixteen switching elements 1 in the respect group 2 are provided.

IF $N=2^5$, the switching-over unit C consists of five groups 2 of switching elements 1, so that five circuit arrangements such as shown in FIG. 6(a) or 6(b) are provided in response thereto, whereby the controlling signal sender 7 is formed. In this case, the input terminals $S_{-1}$, $S_0$, $S_1$, $S_2$, $S_3$ and $S_4$ of each of the above five circuit arrangements are connected with the output portion of the aforesaid $\sigma$ calculating unit 6, and the output terminals $t_0, t_1, \ldots, t_{15}$ thereof are connected respectively with the switching elements 1 having the identifying numbers of 0, 1, ..., 15 in order in each of the above five groups 2.

According to the above state of connections, for example, in case $a_0=0$ and further $\sigma_0=\sigma[0]\bullet\sigma[1]$, the input terminals $S_0$ and $S_1$ of the above-mentioned circuit arrangement are applied with signals having the logic level of "1". However, out of these signals, the signal applied to the input terminal $S_0$ is inverted to another signal having the logic level of "0", whilst the other signal applied to the input terminals $S_1$ appears at the output terminals $t_1, t_3, t_5, t_7, t_9, t_{11}, t_{13}$ and $t_{15}$ the other signal is then applied as the controlling signal respectively to the switching elements 1 having in order the identifying numbers of 1, 3, 5, 7, 9, 11, 13 and 15 in the group 2 connected with the information supplying unit A, which numbers are represented respectively by binary codes having the lowest order figure of "1", whereby the states of connection in the respective switching elements are turned over 1. The matter is similar to the above regarding the circuit arrangements corresponding respectively to the other results of operation of $\sigma_1, \sigma_2, \sigma_3$ and $\sigma_4$.

It is possible to form the aforesaid controlling signal sender 7 of a read only memory, that is, the so-called ROM.

For example, if $N=2^5$, the identifying numbers of the switching elements 1, the states of connection in which are turned over according to the aforesaid operations of $\sigma[-1]$, $\sigma[0]$, $\sigma[1]$, $\sigma[2]$, $\sigma[3]$ and $\sigma[4]$, are stored in the ROM by addressing those identifying numbers, and then the numbers designated by signals which are applied to the address lines thereof corresponding respectively to the aforesaid operations are derived, whereby the states of connection in those switching elements 1 can be controlled.

Next place, the behavior of the information transfer system provided with the above mentioned circuit arrangement according to the present invention will be explained by referring to some practical examples.

As a first example, the behavior in the situation, where the number N of the output terminals of the information supplying unit A is set as N=4, will be explained.

Figure 7A:
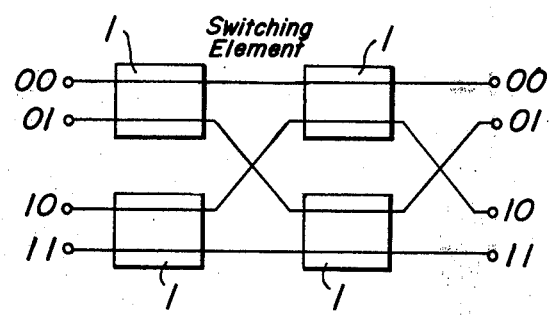
FIGS. 7a and 7f are block diagrams showing respectively various states of connections of the above switching-over unit provided with four or two designated output terminals of the above information supplying unit.

In this situation the number n of the groups 2 of switching elements is set as n=2, and the number N/2 of the switching elements 1 in each of the groups 2 is set as N/2=2. Accordingly, the switching-over unit C is formed of four switching elements 1 as shown in FIG. 7(a), and the output terminals of the information supplying unit A and the input terminals of the information processing unit B are numbered in order respectively by the numerals from 0 to 3, that is, the binary codes of 00, 01, 10 and 11.

Furthermore, all of the above four switching elements are settled in the leading through state. In this state, the output terminals numbered by the binary codes of 00, 01, 10 and 11 in the information supplying unit A are connected respectively with the input terminals numbered by the binary codes of 00, 01, 10 and 11. Two switching elements 1 consisting in each of two groups 2 are numbered in order respectively by the numerals 0 and 1.

On the other hand, the designating signal Ax, which includes the symbols x, is classified by five kinds of (0, x), (1, x), (x, 0), (x, 1) and (x, x), so that the aforesaid behavior will be explained with regard to these five kinds of designating signals Ax by referring to FIGS. 7(b) to 7(f) respectively as follows.

Figure 7B:
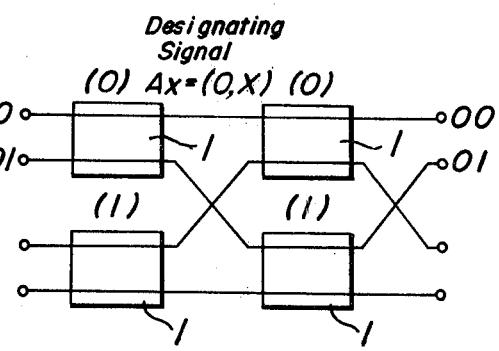

(a) In the case Ax=(0, x) (FIG. 7(b))

Since $a_0 = x$ and $a_1 = 0$, $|x| = 1$ and $\beta_0 = 0$, so that $b_0 = \beta_0 - 0 = 0$ and $b_1 = 0$.

Consequently, $$\sigma_0 = \sigma[n - b_0] \bullet \sigma[b_0] = \sigma[2] \bullet \sigma[0]$$

and $$\sigma_1 = \sigma[0] \bullet \sigma[b_1] = \sigma[0] \bullet \sigma[0].$$

According to the aforesaid definition of the $\sigma$ calculation, the symbol $\sigma[0]$ represents an operation such as all of the states of connection are not turned over at all, while the symbol $\sigma[2]$ represents an operation such as the state of connection in the switching element 1 in each of the groups 2, which is numbered by the binary code, the second order figure thereof from the lowest order being "1", is turned over. However, in the above case, the binary code numbering the switching element 1 is formed of one figure, that is, "0" and "1", so that the state of connection in this switching element 1 is not turned over by the operation of $\sigma[2]$.

Accordingly, the states of connection in the switching elements 1 in each of the groups 2 are not turned over at all by both of the operations of $\sigma_0$ and $\sigma_1$ according to the above equations, so that the initial state of leading through in the switching elements 1 are maintained as shown in FIG. 7(b), and, as a result thereof, the output terminals of the information supplying unit A, which are numbered by the binary codes 00 and 01 designated by the designating signal Ax, are connected respectively with the input terminals of the information processing unit B, which are numbered by the binary codes 00 and 01 in order.

Figure 7C:
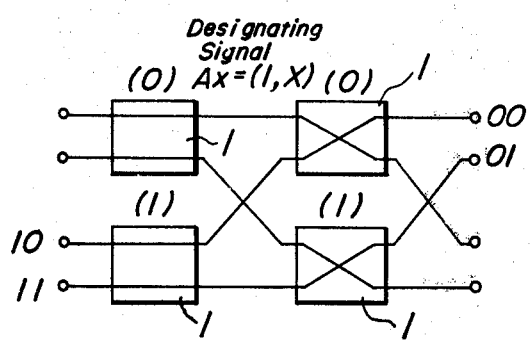

(b) In the case Ax=(1, x) (FIG. 7(c))

Since $a_0 = x$ and $a_1 = 1$, $|x| = 1$ and $\beta_0 = 0$, thus $b_0 = \beta_0 - 0 = 0$ and $b_1 = 0$.

Consequently, $$\sigma_0 = \sigma[n - b_0] \bullet \sigma[b_0] = \sigma[2] \bullet \sigma[0]$$

and $$\sigma_1 = \sigma[-1] \bullet \sigma[b_1] = \sigma[-1] \bullet \sigma[0]$$

The matter concerning the operation of $\sigma[2]$ is just the same to that in the above case (a), so that the states of connection in the switching elements 1 are not turned over at all.

Accordingly, as shown in FIG. 7(c), the states of connection in the switching elements 1 in the left side group 2, which are numbered in order by the numerals 0 and 1, are maintained in the initial state of leading through, whilst the states of connection in the switching elements 1 in the right side group 2 are turned over to the crossing state.

As a result thereof, the output terminals of the information supplying unit A, which are numbered by the binary codes 10 and 11, are connected respectively with the input terminals of the information processing unit B, which are numbered by the binary codes 00 and 01 in order.

Figure 7D:
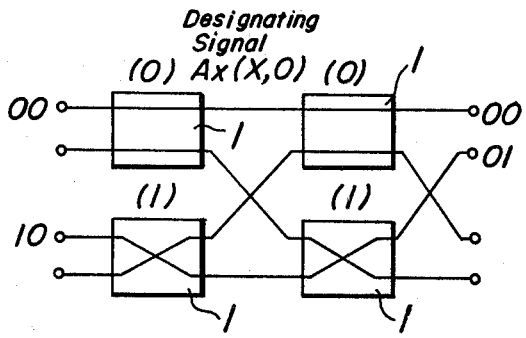

(C) In the case Ax=(x, 0) (FIG. 7(d))

Since $a_0 = 0$ and $a_1 = x$, $|x| = 1$ and $\beta_0 = 1$, thus $b_0 = \beta_0 - 0 = 1$ and $b_1 = 0$.

Consequently, $$\sigma_0 = \sigma[0] \bullet \sigma[b_0] = \sigma[0] \bullet \sigma[1]$$

and $$\sigma_1 = \sigma[n - b_0] \bullet \sigma[b_1] = \sigma[1] \bullet \sigma[0]$$

According to the aforesaid definition of the $\sigma$-calculation, the symbol $\sigma[1]$ represents an operation such as the state of connection in the switching element 1 in each of the groups 2, which is numbered by the binary code, the lowest order figure thereof being "1", that is, by the numeral of 1, is turned over. Thus, as shown in FIG. 7(d), the state of connection in the switching element 1 in the left side group 2, which is numbered by the numeral 1, arranged on the lower side, is turned over to the crossing state, and further the matter is just the same in the right side group 2. As a result thereof, the output terminals of the information supplying unit A, which are numbered by the binary codes 00 and 10 designated by the designating signal Ax, are connected respectively with the input terminals of the information processing unit B, which are numbered by the binary codes 00 and 01 in order.

Figure 7E:
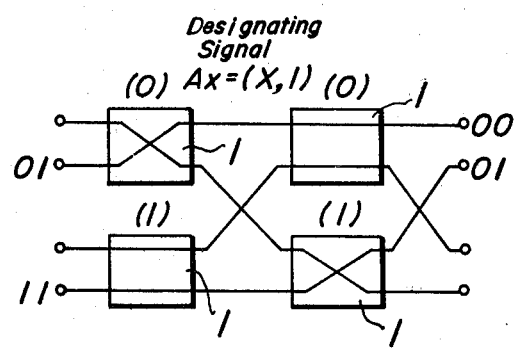

(d) In the case Ax=(x, 1) (FIG. 7(e))

Since $a_0 = 1$ and $a_1 = x$, $|x| = 1$ and $\beta_0 = 1$, thus $b_0 = \beta_0 - 0 = 1$ and $b_1 = 0$.

Consequently, $$\Gamma_0 = \sigma[-1] \bullet \sigma[b_0] = \sigma[-1] \bullet \sigma[1]$$

and $$\sigma_1 = \sigma[n - b_0] \bullet \sigma[b_1] = \sigma[1] \bullet \sigma[0]$$

The matter concerning the operation of $\sigma[1]$ is just the same to that in the above case (c), so that the states of connection in the switching elements 1 numbered by the numeral of 1 are turned over.

Accordingly, as shown in FIG. 7(e), first, the states of connection in all of the switching elements 1 in the left side group 2 are turned over to the crossing state, and then, only the state of connection in the switching element numbered by the numeral of 1 is turned over again to the leading-through state, whilst the state of connection in the switching element in the right side group 2, which element is numbered by the numeral 1, is turned over to the crossing state.

As a result thereof, the output terminals of the information supplying unit A, which are numbered by the binary codes 01 and 11 designated by the designating signal Ax, are connected respectively with the input terminals of the information processing unit B, which are numbered by the binary codes 00 and 01 in order.

Figure 7F:
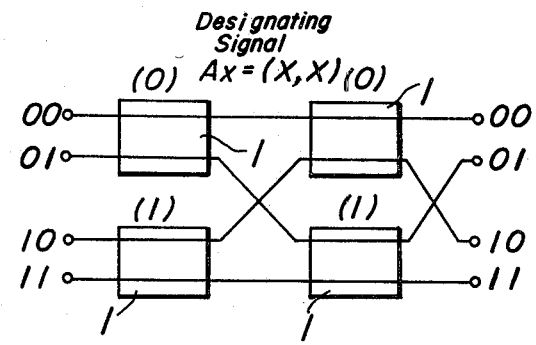

(e) In case Ax=(x, x) (FIG. 7(f))

Since $a_0=x$ and $a_1=x$, $|x|=2$, $\beta_0=0$ and $\beta_1=1$, $b_0=\beta_0-0=0$ and $b_1=\beta_1-1=0$.

Consequently, $$\sigma_0=\sigma[n-b_0]\bullet\sigma[b_0]=\sigma[2]\bullet\sigma[0]$$

and $$\sigma_1=\sigma[n=b_1]\bullet\sigma[b_1]=\sigma[2]\bullet\sigma[0]$$

The matter concerning the operation of $\sigma[2]$ is just the same to those in the above cases (a) and (b), so that the states of connection in the switching elements 1 are not turned over at all.

Accordingly, the states of connection in the switching elements 1 in each of the groups 2 are not turned over at all by the operations of $\sigma_0$ and $\sigma_1$ according to the above equations, so that the initial state of leading through in the switching elements 1 are maintained as shown in FIG. 7(f), and, as a result thereof, the output terminals of the information supplying unit A, which are numbered by the binary codes 00, 01,10 and 11 designated by the designating signal Ax, are connected respectively with the input terminals of the information processing unit B, which are numbered by the binary codes 00, 01, 10 and 11 in order.

Next, in a case wherein the designating signal Ax does not include the number of x, namely, is represented by the symbols of (0, 0), (0, 1) and (1, 1), $|x|=0$ and $b_0=b_1=0$, so that both of the operations $\sigma_0$ and $\sigma_1$ result in either of $\sigma[0]$ and $\sigma[=1]$.

Figure 8A:
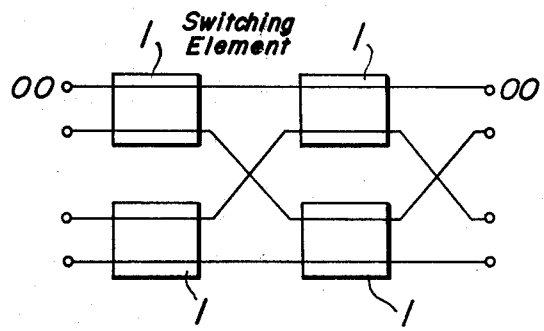
FIGS. 8a and 8d are block diagrams showing respectively various states of connections of the above switching-over unit provided with only one designated output terminal of the above information supplying unit.

When $A(x)=(0, 0)$, $\sigma_0=\sigma[0]$ and $\sigma_1=\sigma[0]$, as shown in FIG. 8(a), the states of connection in the switching elements 1 are not turned over at all.

Accordingly, the original leading-through states thereof are maintained.

As a result thereof, the output terminal of the information supplying unit A, which is numbered by the binary code 00, is connected with the input terminals of the information processing unit B, which is numbered by the finary code 00 also.

Figure 8B:
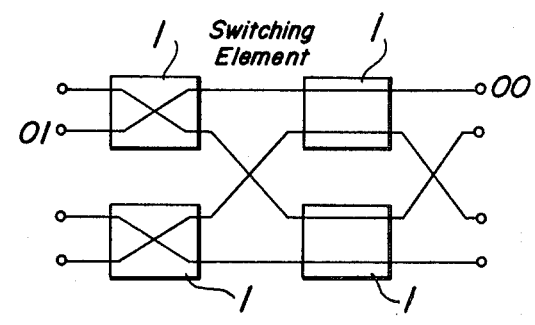

When Ax =(0, 1), $\sigma_0=\sigma[-1]$ and $\sigma_1=\sigma[0]$, as shown in FIG. 8(b), the states of connection in the switching elements in the left side group 2 are turned over to the crossing state.

As a result thereof, the output terminal of the information supplying unit A, which is numbered by the binary code 01, is connected with the input terminal of the information processing unit B, which is numbered by the binary code 00.

Figure 8C:
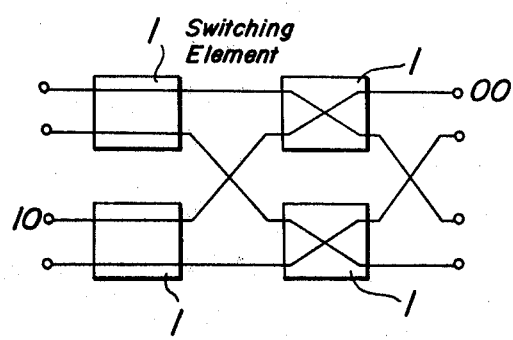

When Ax=(1, 0), $\sigma_0=\sigma[0]$ and $\sigma_1=\sigma[-1]$, so that, as shown in FIG. 8(c), the states of connection in both of switching elements 1 in the right side group 2 only are turned over to the crossing state.

As a result thereof, the output terminal of the information supplying unit A, which is numbered by the binary code 10, is connected with the input terminal of the information processing unit B, which is numbered by the binary code 00.

Figure 8D:
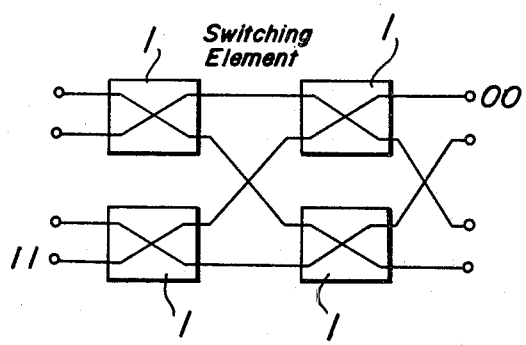

When Ax=(1, 1), $\sigma_0=\sigma[-1]$ and $\sigma_1=\sigma[-1]$, as shown in FIG. 8(d), the states of connection in all of switching elements 1 are turned over to the crossing state.

As a result thereof, the output terminal of the information supplying unit A, which is numbered by the binary code 11, is connected with the input terminal of the information processing unit B, which is numbered by the binary code 00.

Next, as a second example, the behavior in the situation, where the number N of the output terminals of the information supplying unit A is set as $N=32=2^5$, will be explained.

In this situation the number n of the groups 2 of switching elements is settled as $n=5$, and the number N/2 of the switching elements 1 in each of the groups 2 is set as N/2=16. Accordingly, the switching-over unit C is formed of $16\times5=80$ of switching elements 1. However, for example, in a case wherein the number of the input terminals of the information processing unit B is restricted to four, as shown in FIG. 9, it is possible to omit twenty switching elements 1 out of those eighty switching elements 1.

Accordingly, in the above example, the output terminals of the information supplying unit A are numbered by the numerals from 0 to 32, that is, the binary codes from 00000 to 11111, and the input terminals of the information processing unit B are numbered by the numerals from 0 to 3, that is, the binary codes from 00 to 11. Furthermore, the switching elements 1 consisting in each of the groups 2 are numbered by the numerals from 0 to 15, that is, the binary codes from 0000 to 1111in order from the top thereof.

The behavior of the information transfer system according to the present invention in the situation where all of the switching elements 1 are set as leading through in the initial state, and the number of the input terminals of the information processing unit B is restricted to four as shown in FIG. 9, and further the designating signal Ax is set as Ax=(0, x, 1, x, 0) will be explained as follows.

Since $a_0=0$, $a_1=x$, $a_2=1$, $a_3=x$ and $a_4=0$, $|x|=2$, $\beta_0=1$ and $\beta_1=3$, so that $b_0=\beta_0-0=1$,
$b_1=\beta_1-1=2$ and
$b_2=b_3=b_4=0$.

Consequently, $\sigma_0=\sigma[0]\bullet\sigma[b_0]=\sigma0]\bullet\sigma[1]$
$\sigma_1=\sigma[n-b_0]\bullet\sigma[b_1]=\sigma[4]\bullet\sigma[2]$
$\sigma_2=\sigma[-1]\bullet\sigma[b_2]=\sigma[-1]\bullet\sigma[0]$
$\sigma_3=\sigma[n-b_1]\bullet\sigma[b_3]=\sigma[3]\bullet\sigma[0]$ and $\sigma_4=\sigma[0]\bullet\sigma[b_4]=\sigma[0]\bullet\sigma[0]$ Thus, in the group 2 of the switching elements 1 in the first column, that is, in the left end column, the states of connection in the switching elements 1 numbered by the binary codes, the lowest order figure of which is designated to "1"by the operation of $\sigma_0$, are turned over to the crossing state.

In the group 2 of the switching elements 1 in the second column, the state of connection in the switching elements 1 numbered by the binary codes, the fourth order bit from the lowest order, that is, the highest order bit of which is designated to "1" by the operation of $\sigma_1$, are turned over to the crossing state, and then the states of connection in the switching elements 1 numbered by the binary codes, the second order bit from the lowest order of which is designated to "1", are turned over to either the crossing state or the leading-through state.

In the group 2 of the switching elements 1 in the third column, the states of connection in all of the switching elements 1 are turned over to the crossing state by the operation of $\sigma_2$.

In the group 2 of the switching elements 1 in the fourth column, the states of connection in the switching elements 1 numbered by the binary codes, the third order bit from the lowest order of which is designated to "1" by the operation of $\sigma_3$, are turned over to the crossing state.

In the group 2 of the switching elements 1 in the fifth column, that is, in the right end column, the states of connection in all of the switching elements 1 are not turned over at all, so that the initial states of leading through thereof are maintained.

As a result thereof, the states of connection in all of the switching elements in the switching-over unit C are set as shown in FIG. 9, so that the output terminals of the information supplying unit A, which are numbered by the binary codes 00100, 00110, 01100 and 01110 designated by the designating signal Ax, are connected with the input terminals of the information processing unit B, which are numbered by the binary codes 00, 01, 10 and 11 in order.

As is apparent from the explained above, according to the present invention, for extracting the desired informations from a large number of stored informations such an operation is performed the states of connection in each of the switching elements, which are arranged in a matrix, are set by referring to the numbers and the amount of the desired information. Thus, it is possible to transfer the desired information rapidly from the information supplying unit to the information processing unit, and particularly, even if a large number of input and output terminals to be switched over therebetween are provided for transferring a large amount of data, it is possible to transfer those data rapidly according to time division. Furthermore, it is not required according to the present invention to memorize the respective combinations between all of input and output terminals to be switched over therebetween or to carry out complicated calculations with regard to each of those terminals, so that it is possible to simplify the configuration of the switching-over commander required for switching over those terminals.

Consequently, the information rapid selection and transfer system according to the present invention is extremely preferable for a data transfer controlling apparatus to be arranged between a data memory provided with a large number of output terminals and a central operation processing apparatus provided with a limited number of input terminals in an electronical control system used for a motor car and other like vehicles, in which system the amount of data to be transferred shows an upward trend.

What is claimed is:

1. A high speed information selection and transfer system, comprising:

an information supplying unit for supplying a plurality of information units which are identified by a plurality of binary codes of n bits, respectively;

a switching over unit comprising a plurality of switching elements arranged in a matrix and connected with each other between successive columns of said matrix, each element being provided with a pair of input terminals and a pair of output terminals, a connection between said pair of input terminals and a pair of output terminals in each of said switching elements being switched over between two states of parallel and crossing, and said input terminals of said switching element in the input side column of said matrix being supplied with said plurality of information units derived from said information supplying unit, respectively;

a switching over commander for controlling the switching over of the states of connection in said plurality of switching elements to transfer selectively at least one of said plurality of information units from said input terminals of said switching elements in the input side column of said matrix to at least either of said pair of output terminals of at least one of said switching elements in the output side column of said matrix;

said switching over commander comprising:

a designated signal unit for forming a designating signal Ax, which is used for designating said switching elements to be switched over as:

$Ax = (a_{n-1} a_{n-2}, \ldots, a_i, \ldots, a_1, a_0)$;

a buffer memory for storing said designating signal Ax in a predetermined time duration, an arithmetic unit for effecting a calculation whereby, according to a result of comparison between i-th order bits of binary codes which identify desired information to be selected out of said plurality of information units, respectively, $a_i = 0$ if all of said i-th order bits are "0", $a_i = 1$ if all of said i-th order bits are "1", and $a_i = x$ if said i-th order bits are different from each other, and a parameter $b_i$, which represents a position of the symbol x in said designating signal Ax, being calculated by:

$$b_i = \begin{bmatrix} \beta_i - i(i = 0, 1, 2, \ldots, |x| - 1) \\ 0 \ (i = |x|, |x| + 1, \ldots, n - 1) \end{bmatrix}$$

where $|x|$ represents a number of x in said designating signal Ax, and further the switching elements in each of the columns of said matrix of said switching-over unit being identified numerically by another plurality of binary codes, respectively, a sigma calculating unit for effecting a calculation whereby the control of the switching over of the states of connection in said plurality of switching element is performed in such a manner that with respect to the switching elements in the i-th column of said matrix of said switching-over unit:

if $a_i = 0$, the states of connection in the switching elements, which are numbered by the binary codes the $b_i$-th order bits of which binary codes are "1", are switched over, if $a_i = 1$, initially, the states of connection in all of said switching elements in said i-th column of said matrix are switched over, and then the states of connection in the switching elements, which are numbered by the binary codes the $b_i$-th order figures of which binary codes are "1", are switched over, and if $a_i = x$, initially, the states of connection in the switching elements, which are numbered by the binary codes the n-$b_i$-th order figures of which binary codes are "1", where the symbol z represents the value of the symbol x positioned between the terms $a_0$ and $a_{z-1}$ of said designating signal Ax, are switched over, and then the states of connection in the switching elements, which are numbered by the binary codes the $b_i$-th order figures of which binary codes are "1", are switched over, and a controlling signal sender for setting the state of connection of said plurality of switching elements in said switching over unit in response to the result of the calculation effected by said sigma calculating unit; and an information processing unit for processing the information units derived from said switching over unit with a plurality of input terminals which correspond in order to said output terminals of the switching elements in the output side column of the matrix.

2. A high speed information selection and transfer system as claimed in claim 1, wherein the connections of said switching elements between the successive columns of said matrix are performed in such a manner that:

(1) the input terminals and the output terminals of said switching elements in each of the columns of said matrix are identified respectively by the numerals from zero to N−1;

(2) the input terminals of said switching elements in said input side column of said matrix are respectively connected with the N output terminals of said information supplying unit;

(3) out of the output terminals of said switching elements in the output side column of said matrix, at least one of the output terminals identified by the numerals 0, 2, 4, ..., N−2 being connected respectively with at least one of the input terminals numbered by the numerals 0, 1, 2, ..., N/2−1 of said information processing unit, and at least one of the output terminals identified by the numerals 1, 3, 5, ..., N−1 being connected respectively with at least one of the input terminals numbered by the numerals N/2, , N/2+1, N/2+2, ..., N-1 of said information processing unit.

3. A high speed information selection and transfer system as claimed in claim 1, wherein said designating signal is defined by binary codes of n bits which represent the numbers of the N output terminals of said information supplying unit, said output terminals to be connected respectively with successive input terminals of said information processing unit, and to be represented by:

$$Ax = (a_{n-1}, a_{n-2}, \ldots, a_1, a_0)$$

where $a_i \in [0, 1, x]$ ($i = 0, 1, 2, \ldots, n-1$) and $x = O$ or 1.

4. A high speed information selection and transfer system as claimed in claim 3, wherein said parameter is defined by binary codes of n bits which are represented by:

$$Bx = (b_{n-1}, b_{n-2}, \ldots, b_1, b_0)$$

where $$b_i = \begin{bmatrix} B_i - i & (i = 0, 1, \ldots, |x| - 1) \\ 0 & (i = |x|, |x| + 1, \ldots, n-1) \end{bmatrix},$$

and further the symbol $|x|$ represents a number of the symbol x contained in said equation Ax of said designating signal, that is $0 \leq |x| \leq n$, and the symbol $\beta_i$ represents a position of said symbol x in said equation Ax of said designating signal, in case the position of said symbol $a_i$ in said equation Ax of said designating signal is set on the number i.

5. An information selection and transfer system as claimed in claim 1, wherein said sigma calculation is defined in such a manner that, with the N/2 switching elements associated with each of the column of said matrix, a symbol a[k], where k=1, 2, ..., n−1, is defined by an operation whereby the state of connection of the switching element numbered by the binary code k-th order figure of which is "1", is switched over from said state of parallel to said state of crossing, and another symbol $\sigma[-1]$ is defined by another operation whereby the states of connection of all of the switching elements in the designated column of said matrix are switched over, and still another symbol $\sigma[0]$ is defined by still another operation whereby the states of connection of all of said switching elements consisting in said designated column of said matrix.

6. An information selection and transfer system as claimed in claim 5, wherein said result of said sigma calculation is defined by:

$$\Sigma = (\sigma n-1, \sigma n-2, \ldots, \sigma_1, \sigma_0)$$

and $$\sigma_i = \begin{cases} \sigma[0] \cdot \sigma[b_i] & \text{(in a case } a_i = 0) \\ \sigma[-1] \cdot \sigma[b_i] & \text{(in a case } a_i = 1) \\ \sigma[n - bj] \cdot \sigma[b_i] & \text{(in a case } a_i = x) \end{cases}$$

where the symbol j represents a number of the symbols x which are arranged from the term $a_0$ to $a_{i-1}$ in said equation Ax of said designating signal.

* * * * *